United States Patent [19]

Wen et al.

[11] Patent Number: 4,937,061
[45] Date of Patent: * Jun. 26, 1990

[54] ALUMINUM HYDROXYCARBONATE GEL

[75] Inventors: Betty P. L. Wen, Markham; Arthur P. G. Wright, Scarborough; Eric Blaser, Toronto; Suhas H. Ambike, West Hill, all of Canada

[73] Assignee: Warner-Lambert Company, Morris Plains, N.J.

[*] Notice: The portion of the term of this patent subsequent to Jan. 22, 2002 has been disclaimed.

[21] Appl. No.: 124,223

[22] Filed: Nov. 23, 1987

Related U.S. Application Data

[63] Continuation of Ser. No. 539,032, Oct. 5, 1983, abandoned.

[30] Foreign Application Priority Data

Apr. 15, 1983 [CA] Canada .................................. 425935

[51] Int. Cl.⁵ .............................................. C01B 31/24
[52] U.S. Cl. ............................ 423/419 R; 423/419 P; 423/625; 423/630; 423/115; 423/625
[58] Field of Search ............... 423/419 R, 419 P, 629, 423/630, 115, 625

[56] References Cited

U.S. PATENT DOCUMENTS

| | | | |
|---|---|---|---|
| 2,137,638 | 11/1938 | Sondern et al. | 423/630 |
| 3,066,012 | 11/1962 | Wilson, Jr. et al. | 423/630 |
| 3,096,295 | 7/1963 | Michalko | 423/629 |
| 3,408,159 | 10/1968 | Teichner et al. | 423/419 P |
| 3,773,918 | 11/1973 | Beekman | 423/629 |
| 3,911,090 | 10/1975 | Hem et al. | 423/419 P |
| 4,053,568 | 10/1977 | Madaus et al. | 423/419 P |
| 4,105,579 | 10/1978 | Glasscock | 423/629 |
| 4,157,382 | 6/1979 | Goodboy et al. | 423/630 |
| 4,242,328 | 12/1980 | Hem et al. | 423/419 P |
| 4,495,087 | 1/1985 | Ng et al. | 423/629 |

OTHER PUBLICATIONS

Japanese 55-010464, Jan. 1980 (Abstract).
Russian 852,798, Sep. 1981 (Abstract).

Primary Examiner—Robert L. Stoll
Assistant Examiner—Paige C. Harvey
Attorney, Agent, or Firm—Charles A. Gaglia, Jr.; Gary M. Nath; Henry C. Jeanette

[57] ABSTRACT

Continuous production of aluminum hydroxycarbonate gel by continuous reaction of aluminum salt solution with mixed alkaline carbonate and bicarbonate solution under homogeneous conditions in a relatively small reaction vessel, and continuing the reaction in a subsequent reaction vessel under controlled pH. The product gel is separated from the non-aluminum cation containing reaction mixture within less than about 6 hours, whereby formation of poorly soluble addition reaction products such as dihydroxy aluminium sodium carbonate, which contribute undesired non-aluminum cations to the gel product, is reduced. The aluminum salt solution is adjusted in pH by adding to it a portion of the mixed carbonate and bicarbonate solution to obtain a clear solution of pH 3.5 to 4.0. This results in a smooth, creamy gel with less objectionable chalky mouth feel.

24 Claims, 1 Drawing Sheet

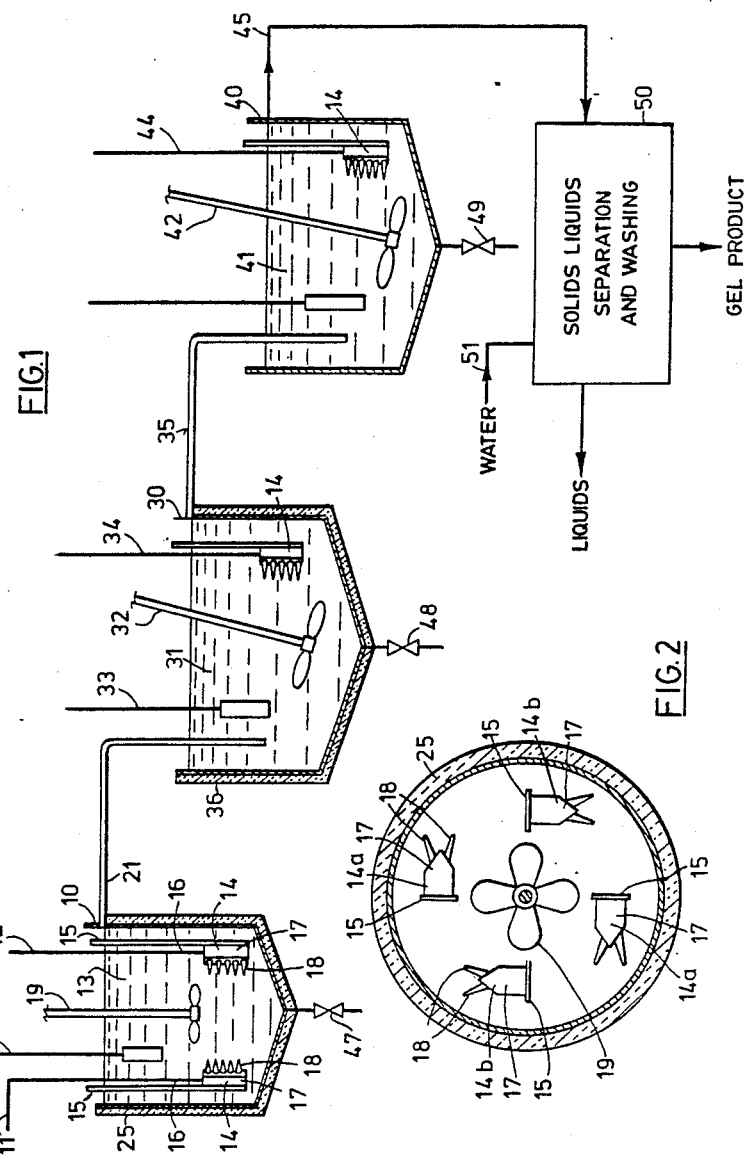

ALUMINUM HYDROXYCARBONATE GEL

This is a continuation of copending application Ser. No. 539,032, filed on Oct. 5, 1983, now abandoned.

This invention relates to a process for the production of aluminium hydroxycarbonate gel, suitable for use in the formulation of orally-administered antacids.

In copending U.S. Ser. No. 452,997, filed Dec. 27, 1982, now U.S. Pat. No. 4,495,087 we have described a continuous process for the production of aluminium hydroxycarbonate gel in which an aqueous solution of an aluminium salt and an aqueous alkaline solution containing carbonate and bicarbonate anion are reacted together under substantially homogeneous conditions in an initial reactor vessel to obtain an aluminium hydroxycarbonate gel precipitate. The reaction mixture is continuously withdrawn from the initial reactor vessel and is passed to a subsequent reaction vessel where the gel-forming reaction is permitted to proceed. In the said process, the initial reaction can take place in a relatively small initial reactor vessel in which the average residence time of the reaction mixture can be quite brief, and within this small volume of reaction mixture, efficient mixing of the reactants can be more readily achieved, so that the reaction mixture can be maintained in a highly homogeneous condition. It has been found that gel precipitate products obtained from continuous processing exhibit outstandingly fast acid-consuming reactivity, even when the gel products are thoroughly washed to remove nonaluminium cations. Many known aluminium hydroxycarbonate gel products that have good acid-consuming reactivity contain relatively high proportions of non-aluminium cations, and the acid-consuming reactivity of these products is, in large measure, attributable to the presence of free metal carbonate in the product. In contrast, products obtained with the above-described continuous processing may exhibit high reactivities even when thoroughly washed to reduce the molar ratio of nonaluminium cations to aluminium to a relatively low level.

It has been disclosed in U.S. Pat. No. 4,053,568 dated October 11, 1977, in the name Madaus et al, that when obtaining a precipitate by the reaction of solutions of aluminium chloride, aluminium nitrate and/or aluminium sulphate with alkali bicarbonate and/or alkali carbonate, at pH 6.8 to 7.8, preferably 7.0 to 7.3, the precipitate can be particularly well purified by washing away side products after an ageing period of at least 12 hours, more preferably 15 hours, and after adjusting the reaction mixture to a pH value of about 6 by addition of an acidic aqueous aluminium salt solution.

We have now found that it can be undesirable to age the gel product in contact with the reaction products for excessively prolonged periods in excess of about 6 hours, since, with prolonged ageing of the gel under the conditions proposed by Madaus et al although the removal of anions such as sulphate may be facilitated, there is an increased tendency for poorly soluble addition compounds to be formed by a reaction between the aluminium hydroxycarbonate and sodium and like cations present in the reaction mixture. For example, we have found that on ageing of the aluminium hydroxycarbonate gel in its mother liquor for prolonged periods in the presence of sodium bicarbonate remaining in the reaction mixture, substantial quantities of poorly soluble dihydroxy aluminium sodium carbonate (DASC) or dawsonite are formed as a by-product. DASC is a substantially insoluble sodium compound, and once formed it is not possible to remove DASC from the aluminium hydroxycarbonate gel by simple washing. In many cases, it is desired to provide an aluminium hydroxycarbonate gel product which is substantially free of, or only very low contents of non-aluminium cations. Thus, for example, for dietetic reasons, or in order to meet requirements for maximum contents of non-aluminium cations prescribed for certain products, it may be necessary to provide products having certain maximum contents of non-aluminium cations.

Accordingly, in one aspect, the present invention provides a process for the continuous production of aluminium hydroxycarbonate gel comprising continuously reacting together under substantially homogeneous conditions in an initial reactor vessel an aqueous solution of an aluminium salt and an aqueous alkaline solution containing carbonate and bicarbonate anion to obtain an aluminium hydroxycarbonate gel precipitate, continuously withdrawing the reaction mixture from the initial reactor vessel, passing the reaction mixture to a subsequent reaction vessel and permitting the gel-forming reaction to proceed, and subsequently recovering the gel precipitate from the reaction mixture and removing non-aluminium cations from the gel precipitate within such time that on average the gel precipitate is in contact with the reaction products containing non-aluminium cations for a period of no more than about 6 hours.

Preferably, said period is no more than about 3 hours. By thus limiting the period of time for which, on average, the gel precipitate is in contact with the reaction products from the time at which the gel precipitate is initially formed in the initial reaction vessel to the time at which the gel precipitate is substantially freed of non-aluminium cations, for example by separating the gel precipitate from the reaction mixture and washing the precipitate to remove solubles, the tendency for formation of non-aluminium cation-containing poorly soluble addition compounds can be greatly reduced, whereby the content of sodium or like non-aluminium cations in the final product can be greatly reduced. It has been found that the reduced ageing period does not result in there being any undue difficulty in removing undesired anions from the gel product, and by simple washing of the product it is possible to reduce the contents of undesired anions to acceptable levels. The tendency for formation of these poorly soluble addition compounds may also be reduced when lower concentrations of the aluminium salt and of the carbonate and bicarbonate are employed in the reactant liquids, and when the precipitation is conducted at low temperatures.

We have further now found that the quality of the gel precipitate, and in particular the taste and mouth feel of the precipitate, can be improved by pre-adjusting the pH of the acid-reacting aluminium salt solution to a higher (more basic) pH by pre-reacting it with some of the alkaline carbonate and bicarbonate solution. Typically, the aqueous solution of the aluminium salt, as made up, will have a pH less than about 3. It has been found that by pre-adjusting the initial solution by mixing it with the aqueous alkaline carbonate and bicarbonate solution in an amount insufficient to result in the formation of any precipitate, but sufficient to achieve a clear solution having a pH about 3.5 to about 4, the product subsequently obtained has a strikingly more pleasant taste, with a more smooth and creamy mouth feel than the product obtained from the reaction of non-preadjusted aluminium salt solutions. The products obtained from the latter solutions tend to have a chalky taste and mouth feel.

Accordingly, in a further aspect, the present invention provides a process for the continuous production of aluminium hydroxycarbonate gel comprising adjusting the pH of an acid-reacting aqueous solution of an aluminium salt having an initial pH of less than about 3 by mixing it with an aqueous alkaline solution containing carbonate and bicarbonate anion to obtain a clear reactant aluminium salt solution of pH about 3.5 to about 4, continuously reacting together under substantially homogeneous conditions in an initial reactor vessel said clear reactant aluminium salt solution and an aqueous alkaline solution containing carbonate and bicarbonate anion to obtain an aluminium hydroxycarbonate gel precipitate, continuously withdrawing the reaction mixture and passing it to a subsequent reaction vessel and permitting the gel-forming reaction to proceed, recovering the gel precipitate from the reaction mixture and removing non-aluminium cations from the gel precipitate.

The process will now be more fully described with reference to the accompanying drawings, in which:

FIG. 1 shows in a schematic form one example of apparatus employed in conducting the process in accordance with the invention; and FIG. 2 shows a horizontal section through the initial reactor vessel of the apparatus of FIG. 1.

With reference to FIG. 1, an initial reactor vessel 10 has inlets 11 and 12 for the introduction of a mixed carbonate and bicarbonate solution, and an aluminium salt solution, respectively. Each solution enters reaction mixture 13 in reactor vessel 10 through an injection unit 14, of the type described in our co-pending U.S. Ser. No. 452,997, filed Dec. 27, 1982, now U.S. Pat. No. 4,495,087 to which reference should be made for further details. Each unit comprises a stainless steel delivery tube 16 leading to a header box 17 on which are secured two divergent rows of nozzle pieces 18. Preferably the header box 17 and nozzle pieces 18 are made of inert materials or corrosion resistant metals. Each nozzle piece 18 comprises a tube that tapers towards a capillary-sized orifice at the tip.

In the preferred form, as illustrated in FIG. 2, there are two or more injection units for each reacting solution, with pairs of the injection units 14a for the aluminium salt solution and 14b for the carbonate and bicarbonate solution. These injectors are arranged diametrically opposite one another within reactor vessel 10 with the injection nozzles 18 positioned generally in a tangential direction. The reactor vessel 10 is provided with a conventional form of agitator 19 which induces high mass transfer and rotates in the sense conforming to the injecting directions of the injection units 14. Near the top of reactor 10 is outlet 21 through which the slurry overflows into the bulk of reaction mixture 31 in a subsequent reaction vessel 30. This maintains an approximately constant liquid level within the reactor vessel 10.

As can be seen from FIG. 2, in the preferred arrangement the injection units 14a and 14b include baffle plates 15 which are orientated radially so as to create turbulence within the reactor vessel, thus promoting homogeneous mixing of the contents of the reaction mixture.

On start-up of the process, the reactor vessel 10 may first be filled with a mixture of carbonate and bicarbonate solutions in the desired proportions, and then, with the agitator 19 being operated under high mass transfer conditions, injection of the aluminium salt solution or a pre pH-adjusted aluminium salt solution through the input line 12 and injection units 14a is commenced simultaneously with injection of a mixed carbonate and bicarbonate solution through the input lines 11 and injection units 14b, and outflow of reaction mixture at a corresponding flow rate is commenced through the output pipe 21. The injection of the solution through the injector units 14a and 14b is made with the solutions under positive pressure so that penetration of the reaction mixture 13 back into the capilliary nozzles 18 is prevented.

Because of its lower cost, it is normally preferred to use an aqueous solution of aluminium sulfate in this process, but other aluminium salts such as the chloride, nitrate or perchlorate can be used. One advantage of the process as illustrated is that relatively high concentrations of aluminium salt solution can be employed. Since very high mixing efficiency can be achieved in the continuous flow reactor 10, local concentration build-up for the aluminium salt can be substantially avoided, whereby loss of carbonate anion through evolution of carbon dioxide is very much reduced. For example, in the case of aluminium sulfate tetradecahydrate solution, concentrations up to about 40% by weight may be employable. The use of concentrated solutions has the advantage that higher rates of production of the aluminium hydroxycarbonate gel product can be achieved using production equipment of relatively small capacity. However, the use of highly concentrated solutions tends to produce a product of coarser particle size, and in some cases a fine particle size may be desirable. Further, the use of highly concentrated solutions may lead to undesired quantities of poorly soluble non-aluminium cation-containing addition compounds being formed. Preferably, the aluminium salt solution will contain about 5 to about 20% w:w of the aluminium salt. More generally, the aluminium salt solution preferably contains about 0.1 to about 2.1 moles $Al^{3+}$ ion per litre, more preferably about 0.4 to about 0.7 moles $Al^{3+}$ ion per liter, still more preferably about 0.6 moles $Al^{3+}$ ion per liter. In the case in which the pH of the aluminium salt solution is preadjusted to obtain a clear reactant aluminium salt solution of pH about 3.5 to about 3.4, the pre-pH-adjusted clear reactant salt solution injected into the reactor vessel 10 will preferably contain about 0.1 to about 0.6 moles $Al^{3+}$ ion per liter, more preferably about 0.3 to about 0.5 moles $Al^{3+}$ ion per liter, still more preferably about 0.4 moles $Al^{3+}$ ion per liter.

In the preferred process, the alkaline carbonate and bicarbonate solution comprises a solution of an alkali metal carbonate and an alkali metal bicarbonate although other water-soluble alkaline-reacting carbonate and bicarbonate solutions may be employed, for example ammonium carbonate and ammonium bicarbonate. Because of their low cost and widespread availability, the use of sodium carbonate and sodium bicarbonate is preferred, although in the case of the production of specialized sodium-free gel products, a mixture of potassium carbonate and potassium bicarbonate may be employed instead.

Preferably, the alkaline solution fed through the inlet line 11 contains from about 1 to 5% w:w sodium carbonate, more preferably about 1.8% w:w, and the bicarbonate content ranges from about 2.0 to about 8% w:w, more preferably about 2.8% w:w. In more general terms, this alkaline solution should preferably contain about 0.03 to about 0.6 moles $CO_3^{2-}$ ion and about 0.06 to about 1.2 moles $HCO_3^-$ ion per liter, more preferably about 0.1 to about 0.3 moles $CO_3^{2-}$ ion and about 0.2 to about 0.4 moles $HCO_3^-$ ion per liter, still more preferably about 0.17 moles $CO_3^{2-}$ ion and about 0.34 moles $HCO_3^-$ ion per liter.

In order to facilitate control of the reaction, increase the yield of aluminium hydroxycarbonate gel, and reduce the loss of carbonate anion through evolution of carbon dioxide, the reaction of $Al^{3+}$ ion with carbonate and bicarbonate anions is preferably brought about in three stages and the pH of the reaction mixture of each stage is carefully monitored. The respective reaction pH in each stage can be kept substantially constant by maintaining a uniform flow rate for each reactant. The reaction mixture within each reaction vessel should be maintained as far as possible in a completely homogeneous state, so that no excess local concentrations of any reactant are built up. The volume of the reaction mixture in each reaction vessel is kept substantially constant by means of an overflowing weir which directs the excess slurry into the bulk of the reaction mixture in the subsequent reaction vessel. When the process reaches its steady state, the overall contact time for the reactants remains substantially constant. This ensures a consistent gel product.

Under the above described reaction conditions, reactor 10 may be provided with a pH measuring probe 24 whereby the pH of reaction mixture 13 may be monitored. The rate of flow of the alkaline and acidic reactant solutions entering through lines 11 and 12 may be adjusted so as to control the pH within a required range. In order to avoid excessive evolution of carbon dioxide, it is preferred to maintain the pH of the reaction mixture 13 slightly more alkaline than that required for optimum precipitation condition. Thus, in the preferred form, mixture 13 is maintained at a pH of about 6.8 to about 7.5, more preferably about 6.9 to about 7.3, and still move preferably about pH 7.0.

This reaction mixture 13 overflows continuously into the subsequent reaction vessel 30 which has its contents 31 thoroughly agitated by a stirrer 32. The reaction conditions in reactor 30 facilitate reaction of bicarbonate anions in the reaction mixture with aluminium hydroxide gel formed in the preceding reactor vessel and transform it in a manner which is still not completely understood into aluminium hydroxycarbonate. This reaction proceeds predominantly below a pH of about 7.0 and above a pH of about 6.0. Above about pH 7.0, the uptake of bicarbonate anion to form hydroxycarbonate proceeds relatively slowly, while below about pH 6.0 the bicarbonate anion is relatively unstable and converts gradually into carbon dioxide and water. Desirably, the reaction mixture is maintained at substantially constant pH in this range, more preferably in the pH range about 6.2 to about 6.8, still more preferably about 6.5, through controlled injection of the aqueous aluminium salt solution through a line 34, provided with an injection unit 14, and measurement of the pH of the mixture 31 is conducted using a probe 33.

The conversion to hydroxycarbonate takes some time to reach completion. While it would in theory be possible to employ a reaction vessel 30 of relatively large capacity in which the reaction mixture can reside for a prolonged period, it is preferred to continuously withdraw the still-reacting mixture from the vessel 30 and pass this to a third reaction vessel 40 where the reaction is allowed to proceed to substantial completion. This facilitates control over the process, facilitates uniform mixing of the reactants within the vessels to maintain homogeneous conditions, and reduces the risk of unreacted material being recovered in the final product.

Hence in the preferred form, as shown in the drawings, the reaction mixture 31 steadily overflows through a weir 35 into the reaction or ageing vessel 40, where aluminium hydroxy-bicarbonate intermediate formed in vessel 30 completes its conversion to aluminium hydroxycarbonate gel through processes of carbonation and polymerization. During this conversion, the pH of the reaction mixture 41 in the vessel 40 gradually rises. A small amount of aluminium sulfate solution or other acid-reacting aluminium salt solution is introduced through a line 44, provided with an injection unit 14 in a controlled manner such that the pH is maintained substantially constant at, preferably, about 6.5. The reaction mixture 41 is vigorously agitated by a stirrer 42 to achieve homogeneous mixing. The pH of the mixture is measured by a probe 43.

The ageing vessel 40 is furnished with a weir overflow 45 to ensure that a constant volume of the liquid slurry is maintained. The reactor 40 retains the slurry long enough for the production of the hydroxycarbonate material through the processes of carbonation and polymerization, which processes are generally refered to as ageing, to reach substantial completion. Prolonged ageing of the gel in its mother liquor is not desired, as it has been found that this results in the formation of poorly soluble addition compounds containing non-aluminium cations such as sodium and like cations. For example, it has been found that ageing of aluminium hydroxycarbonate gel in a mother liquor containing unreacted sodium bicarbonate for a period of 18 to 24 hours results in a product containing 5% by weight of dihydroxy aluminium sodium carbonate (DASC) or dawsonite (wet solids basis) as a by-product. Once formed, it is not possible to remove DASC from the gel product by simple washing, so that if the ageing period for the preparation of the gel is relatively long, DASC is formed and is the main contributor of sodium to the gel product. Accordingly, in the present invention, the period of ageing is regulated so that the period of time for which the gel precipitate is in contact with the reactants containing non-aluminium cation, i.e. the time interval between the first mixing together of the reactants in the reactor vessel 13 with concurrent precipitation of aluminium containing gel material up to the time at which on average the gel material is substantially freed of non-aluminium cations, is no more than about 6 hours, more preferably no more than about 3 hours. In addition to short ageing timer, DASC formation is inhibited by low reaction temperatures and a low final pH of 6.5.

In the subsequent reaction vessel 30 some evolution of carbon dioxide from the reaction mixture continues, and it is desirable to retain the reaction mixture in the ageing vessel 40 for a period sufficient that in the reaction mixture withdrawn from the overflow 45 evolution of carbon dioxide has substantially subsided, as this facilitates the handling of the reaction mixture in subsequent solids-liquids separation processing.

Typically, the average residence time of the reaction mixture in the initial reactor vessel 10, as determined by the capacity of the vessel 10 and the rates of input of the reactant solutions into it, will be about 5 to 15 minutes and the average residence time in the subsequent reaction vessel will be about 15 minutes to about 2 hours, while the period of residence in the ageing vessel 40 may be from about 30 minutes to less than about 6 hours.

In order to avoid impairing the antacid properties of the gel product, it is desirable to conduct the gel forming reaction at below ambient temperatures, typically in the range of about 0° C. to 5° C. For this purpose, the reactant solutions are preferably precooled before being introduced into the vessels 10, 30 and 40. The vessels 10 and 30 in particular may be provided with thermally insulated jacket, 25 and 36 respectively, to reduce heat exchange with the surroundings. The vessels 10, 30 and 40 may be provided with respective drain valves 47, 48 and 49 to permit the vessels to be drained to facilitate cleaning of the vessels during shutdown of the process.

When the process is operated in accordance with the preferred procedure as described above, the precipitated gel slurry 41 withdrawn from vessel 40 is passed to a solid-liquid separator unit 50 optionally through an intermediate holding tank. Preferably a continuously operating unit 50 is employed and in the preferred form this is an ARTISAN (trade mark) continuous pressure filter. In order to reduce the content of the water soluble impurities in the product, especially the content of sodium or potassium salts where sodium or potassium carbonate and bicarbonate are employed as the alkaline-reacting carbonate and bicarbonate solution, the gel product is washed with water in the filter 50, the water being supplied along line 51, to yield the final gel product. Preferably, the filtered gel product is washed with a volume of wash water sufficient to reduce the molar ratio of sodium or other non-aluminium cation: aluminium cations to below about 0.01:1. More preferably, to achieve a product having a desired low content of sodium or other non-aluminium cations, the washing is conducted until the said ratio is below about 0.0049:1. With the above described ARTISAN filter a wash ratio of about 20 to 30 volumes of wash water per volume of filtered gel product may be required to achieve the desired molar ratio. When less efficient forms of filter apparatus are employed, higher wash ratios e.g. of 50 to 100 volumes of wash water per volume of gel may be required. As noted above, continuously-produced gel products formed under highly homogeneous conditions may be washable to desired low contents of sodium or other non-aluminium cations without significant concomitant loss of acid-consuming reactivity. Although applicant does not wish to be bound by any theory, it is known that the acid-consuming reactivity of the gel depends on the presence of carbonate ion in the product, and it is suggested that under the uniform and homogeneous precipitation conditions which can be achieved in continuous processing there is a greater degree of co-valent bonding of carbonate anion to the aluminium hydroxide molecular structure, so that the carbonate is bound to the molecular structure independently of the presence of sodium or other non-aluminium cation.

In the case in which the aluminium salt solution that is employed is a pre-pH-adjusted solution, it is preferred to adjust the pH of the solution to about 3.7, since if the aluminium salt solution is pre-adjusted to a higher pH, there may be problems in removing from the final gel product the anion present in the aluminium sulfate solution. For example, it has been found that if an aluminium salt solution pre-adjusted to a pH of about 4 is employed, although the product has an excellent smooth and creamy mouth there is difficulty in washing the final gel product to remove sulfate ion from it sufficiently to achieve a content of sulfate ion of less than 0.05% w:w (measured at 4% w:w $Al_2O_3$), as is required by the USP standard for aluminium hydroxycarbonate gel products. When an aluminium salt solution pre-adjusted in pH to about pH 3.7 is employed, however, a product having an excellent smooth and creamy mouth feel can be achieved and the product can be readily washed to reduce its content of sulfate or other undesired anion to acceptably low levels.

The aluminium hydroxycarbonate gel may be obtained from the filtration device or other solids-liquids separation device as soft lumps or solid cakes. The gel is thixotropic and may be transformed into a pumpable paste with a high shear homogenizer or a powerful mixer. It may then be mixed with other ingredients and formulated into liquid antacid products. Alternatively, the agitated gel may be pumped into a spray dryer where it is spray dried into a fine powder for tablet use. With the above-described ARTISAN filter, because of the high shear forces exerted in the machine the product is obtained directly as a paste of thin consistency at high solids contents (e.g. 13% $Al_2O_3$). An intermediate stage of fluidization is in such case not required.

Although the above disclosure taken in conjuction with the accompanying drawings provides ample information to one skilled in the art to permit the production of an aluminium hydroxycarbonate gel, for the avoidance of doubt detailed examples of gel-forming processes in accordance with the invention will now be given.

EXAMPLE 1

All solutions were pre-cooled to about 5° C. before being introduced into the reactors. Employing the equipment as illustrated in FIG. 1, reactor vessel 10 (of capacity 60 liters) was first charged with 15 liters of the mixed carbonates solution (4.5% w:w sodium bicarbonate and 2.8% w:w sodium carbonate anhydrous). This was enough to well cover the blades of stirrer 19. Introduction of $Al_2(SO_4)_3$ $14H_2O$ (35% w:w) solution and of the said carbonates solution were then commenced through the inlet lines 12 and 11, feeding these solutions through injectors 14a and 14b respectively. The rates of addition of the two solutions were adjusted so that the pH of reaction mixture 13 remained between 7.0 and 7.3.

Once the volume of reaction mixture 13 in reactor 10 exceeded approximately 50 liters, the slurry discharged continuously into reactor 30 (of capacity 125 liters). The pH of mixture 31 was then lowered to about 6.5 by continuous addition of 35% $Al_2(SO_4)_3$. $14H_2O$ solution through line 34.

When full, the slurry mixture 31 exited through weir 35 into the ageing tank 40 (of capacity 350 liters). There, the pH of mixture 41 was kept substantially constant at 6.5 by the addition of 35% $Al_2(SO_4)_3$. $14H_2O$ solution. The rate of addition of alkaline carbonates to the combined rates of the aluminium sulfate was approximately 5:1, based on the volumes of the solutions.

With the ageing tank 40 full, the discharged slurry was filtered by a horizontal vacuum belt filter. The wet cake was thoroughly washed to remove the undesirables such as sodium bicarbonate and sodium sulfate, within about 3 hours of the time the gel precipitate was initially formed in reactor 10, using four volumes of water per volume of slurry. The cake was sucked dry and stored cold. The production rate was about 30 kg per hour at 9.5% $Al_2O_3$ content.

EXAMPLE 2

A finer gel with much lower sodium content was also produced with the same procedure and equipment as in Example 1. The concentrations of the respective reactants were: $Al_2(SO_4)_3 \cdot 14H_2O$ 15% w/w; sodium bicarbonate 2.3% and sodium carbonate 1.4%. The production rate was about 13.5 kg per hour at 9.5% $Al_2O_3$ content.

EXAMPLE 3

The procedure of Example 1 was followed. However, the mixed carbonates solution employed was a solution containing 1.72% w:w sodium carbonate anhydrous (about 0.17 moles $CO_3^{2-}$ ion per liter) and 2.75% w:w sodium bicarbonate (about 0.34 moles $HCO_3^-$ ion per liter. The aluminium sulfate solution employed was a solution obtained by mixing $Al_2(SO_4)_3 \cdot 14H_2O$ 15% w:w solution with the above mixed carbonate solution to obtain a clear solution of pH 3.7 and with a concentration of $Al_2(SO_4)_3 \cdot 14 H_2O$ of 10.03% w:w (about 0.40 moles $Al^{3+}$ ion per liter). In the course of the reaction, about 3.0 liters per minute of the pre-pH-adjusted aluminium sulfate solution was fed into reactor 10 and about 9.5 liters per minute of the above mixed carbonate solution were added. The pH in reactor 10 was approximately 7.0.

In reactor 30, about 1.8 liters per minute of the pH-adjusted aluminium sulfate solution were added, and the pH in vessel 30 was maintained at about 6.55. In vessel 40, about 0.5 liters per minute of the pH-adjusted aluminium sulfate solution were added, and the pH was maintained at about 6.5. The temperature of the liquids in all three vessels was maintained at about 7° C.

The reaction was continued for a period of about 2½ hours, and 157 kg of gel precipitate in the form of a wet filter cake containing 9.23% w:w $Al_2O_3$ was produced. The filter cake was washed with 13,000 liters of wash water (a washing water ratio of about 85 volumes per volume of filter cake). This washing was completed within about 3 hours of the time the production of gel precipitate was commenced in the reactor 10.

The properties of the aluminium hydroxycarbonate gels obtained were listed in the following Table:

|  | Ex. 1 | Ex. 2 | Ex. 3 |
| --- | --- | --- | --- |
| Aluminium Oxide Content (% w:w) | 9.5 | 9.5 | 9.23 |
| Sodium (% w:w) | 0.21 | 0.0086 | 0.0074 |
| Sodium to Aluminium Molar Ratio | 0.050 | 0.0020 | 0.0018 |
| Carbon Dioxide (% w:w) | 3.85 | 4.18 | 3.88 |
| Carbonate to Aluminium molar Ratio | 0.47 | 0.51 | 0.487 |
| TACP (1) % at 25° C. | 98.0 | 99.4 | 97.5 |
| TACP (1) % at 37° C. | 96.0 | 99.4 | — |
| pH-Stat Reactivity Test (2) (Min at 25° C., $T_{50}$) | 6 | 13 | 5.7 |
| pH-Stat Reactivity Test (2) (Min at 25° C., $T_{90}$) | 9 | 17 | 8.3 |
| Acid Consuming Power (3) | 23.0 | 23.3 | 22.9 |
| Viscosity at 5% Aluminium Oxide cps | 40 | 45 | — |
| Viscosity at 9.23% Aluminium Oxide cps | — | — | 93 |

(1) TACP = Theoretical Acid Consuming Power. See (2).
(2) pH-Stat Reactivity Test, described by Kerkhof et al, J. Pharm. Sci., Vol. 66, 1528 (1977), determines the acid neutralization rate by the gel at a constant pH 3.0 during the whole course of the reaction. The gels used in this invention have been aged for at least 1 month at room temperature. The volume of acid added is plotted against time. This plot can be characterized by $T_{50}$ and $T_{90}$, the times to consume respectively 50% and 90% of the total added acid. The volume of the acid can be converted to % TACP.

$$\% \ TACP = \frac{\text{Vol. acid consumed in Titration}}{\text{Theoretical maximum volume}} \times 100$$

$$= \frac{\text{mL of 1N HCl} \times 102}{\text{Weight of gel} \times \% \ Al_2O_3 \times 6}$$

Where 102 = Molecular weight of $Al_2O_3$
6 = Theoretical number of moles acid consumed per mole $Al_2O_3$ In each case the content of sulfate ion of the final gel product was less than that prescribed by the applicable USP standard (0.05% $SO_4^{--}$ by weight based on 4% by weight of $Al_2O_3$).

We claim:

1. Process for the continuous production of aluminium hydroxycarbonate gel for use in the formulation of orally-administered antacids comprising adjusting the pH in a first vessel of an acid-reacting aqueous solution of an aluminum salt having an initial pH of less than about 3 by mixing it with an aqueous alkaline solution containing carbonate and bicarbonate anion to obtain a clear reactant aluminum salt solution of pH about 3.5 to about 4, withdrawing the clear reactant aluminum salt solution from the first vessel and transferring it to a second vessel wherein the clear reactant aluminum salt solution is continuously reacted with an aqueous alkaline solution containing carbonate and bicarbonate anion in which the reaction in the second reactor vessel is conducted at a pH of about 6.8 to about 7.5, to obtain an aluminum hydroxycarbonate gel precipitate, continuously withdrawing the reaction mixture and passing it to a third vessel and permitting the gel-forming reaction to proceed to completion wherein the gel-forming reaction in the third vessel is conducted at pH about 6.0 to about 7.0, recovering the gel precipitate from the reaction mixture and removing non-aluminum cations from the gel precipitate within such time that on average the gel precipitate is in contact with the reaction products containing non-aluminum cations for a period of no more than about 6 hours after the gel precipitate is completely formed.

2. Process as claimed in claim 1 wherein the reactant aluminum salt solution has a pH of about 3.7.

3. Process as claimed in claim 1 in which the reaction in the second reactor vessel is conducted at a pH of about 6.9 to about 7.3.

4. Process as claimed in claim 1 in which the gel-forming reaction in the third vessel is conducted at pH about 6.2 to about 6.8.

5. Process as claimed in claim 1 in which the gel-forming reaction in the third vessel is conducted at pH about 6.5.

6. Process as claimed in claim 1 in which the aluminum salt is aluminum sulfate.

7. Process as claimed in claim 1 in which said aqueous solution of an aluminum salt contains about 0.1 to about 2.1 moles $Al^{3+}$ ion per liter.

8. Process as claimed in claim 1 in which said aqueous solution of an aluminum salt contains about 0.4 to about 7.0 moles $Al^{3+}$ ion per liter.

9. Process as claimed in claim 1 in which said aqueous solution of an aluminum salt contains about 0.6 moles $Al^{3+}$ ion per liter.

10. Process as claimed in claim 1 or 2 in which the clear reactant aluminum salt solution contains about 0.1 to about 0.6 moles $Al^{3+}$ ion per liter.

11. Process as claimed in claim 1 or 2 in which the clear reactant aluminum salt solution contains about 0.3 to about 0.5 moles $Al^{3+}$ ion per liter.

12. Process as claimed in claim 1 or 2 in which the clear reactant aluminum salt solution contains about 0.4 moles $Al^{3+}$ ion per liter.

13. Process as claimed in claim 1 in which the aqueous alkaline solution comprises sodium carbonate and sodium bicarbonate.

14. Process as claimed in claim 1 in which the aqueous alkaline solution contains about 0.03 to about 0.6 moles $CO_3^{2-}$ ion and about 0.06 to about 1.2 moles $HCO_3^-$ ion per liter.

15. Process as claimed in claim 1 in which the aqueous alkaline solution contains about 0.01 to about 0.3 moles $CO_3^{2-}$ ion and about 0.06 to about 1.2 moles $HCO_3^-$ ion per liter.

16. Process as claimed in claim 1 in which the aqueous alkaline solution contains about 0.17 moles $CO_3^{2-}$ ion and about 0.34 moles $HCO_3^-$ ion per liter.

17. Process as claimed in claim 1 in which non-aluminum cations are removed from the gel precipitate by separating the solids precipitate phase from the liquid phase in a solids-liquids separator device, recovering the solids phase, washing the solids phase and recovering the washed solids phase.

18. Process as claimed in claim 1 including the step of washing the gel precipitate product until the molar ratio of non-aluminum:aluminum cations is reduced to below about 0.01:1.

19. Process as claimed in claim 1 including the step of washing the gel precipitate product until the molar ratio of non-aluminum:aluminum cations is reduced to below about 0.0049:1.

20. Process as claimed in claim 1 in which the reaction mixture is continuously withdrawn from the third vessel and is passed to a final vessel where it is retained until evolution of carbon dioxide from the mixture has substantially completely subsided before recovery of the gel precipitate therefrom.

21. Process as claimed in claim 20 wherein the reaction mixture is maintained in the final vessel in a substantially homogeneous condition and with controlled additions of acid reacting aluminum salt solution thereto to maintain the reaction mixture at substantially constant pH.

22. Process as claimed in claim 21 wherein said pH is about 6.5.

23. Process as claimed in claim 20 in which the aqueous alkaline solution comprises sodium carbonate and sodium bicarbonate.

24. Process as claimed in claim 20 wherein the reactant aluminum salt solution has a pH of about 3.7.

* * * * *